United States Patent [19]

French

[11] 3,931,831

[45] Jan. 13, 1976

[54] ELASTIC CHECK VALVE AND METHOD OF CONSTRUCTION

[76] Inventor: George F. French, 4009 Linden St., Oakland, Calif. 94608

[22] Filed: May 2, 1974

[21] Appl. No.: 466,288

[52] U.S. Cl. ............................ 137/525; 137/525.1
[51] Int. Cl.² ............................................ F16K 15/14
[58] Field of Search .......................... 137/525, 525.1

[56] References Cited
UNITED STATES PATENTS

| | | | |
|---|---|---|---|
| 201,880 | 4/1878 | Johnson | 137/525 |
| 2,247,363 | 7/1941 | Dunn | 137/525 |
| 3,822,720 | 7/1974 | Souza | 137/525.1 |

FOREIGN PATENTS OR APPLICATIONS

| | | | |
|---|---|---|---|
| 183,622 | 3/1963 | Sweden | 137/525 |
| 155,590 | 4/1947 | Australia | 137/525.1 |

*Primary Examiner*—Robert G. Nilson
*Attorney, Agent, or Firm*—James R. Cypher

[57] ABSTRACT

An elongated thin walled elastic member arcuately shaped and connected on the inside wall of a pipe section having a portion deformable under fluid pressure permitting fluid flow in one direction only.

8 Claims, 27 Drawing Figures

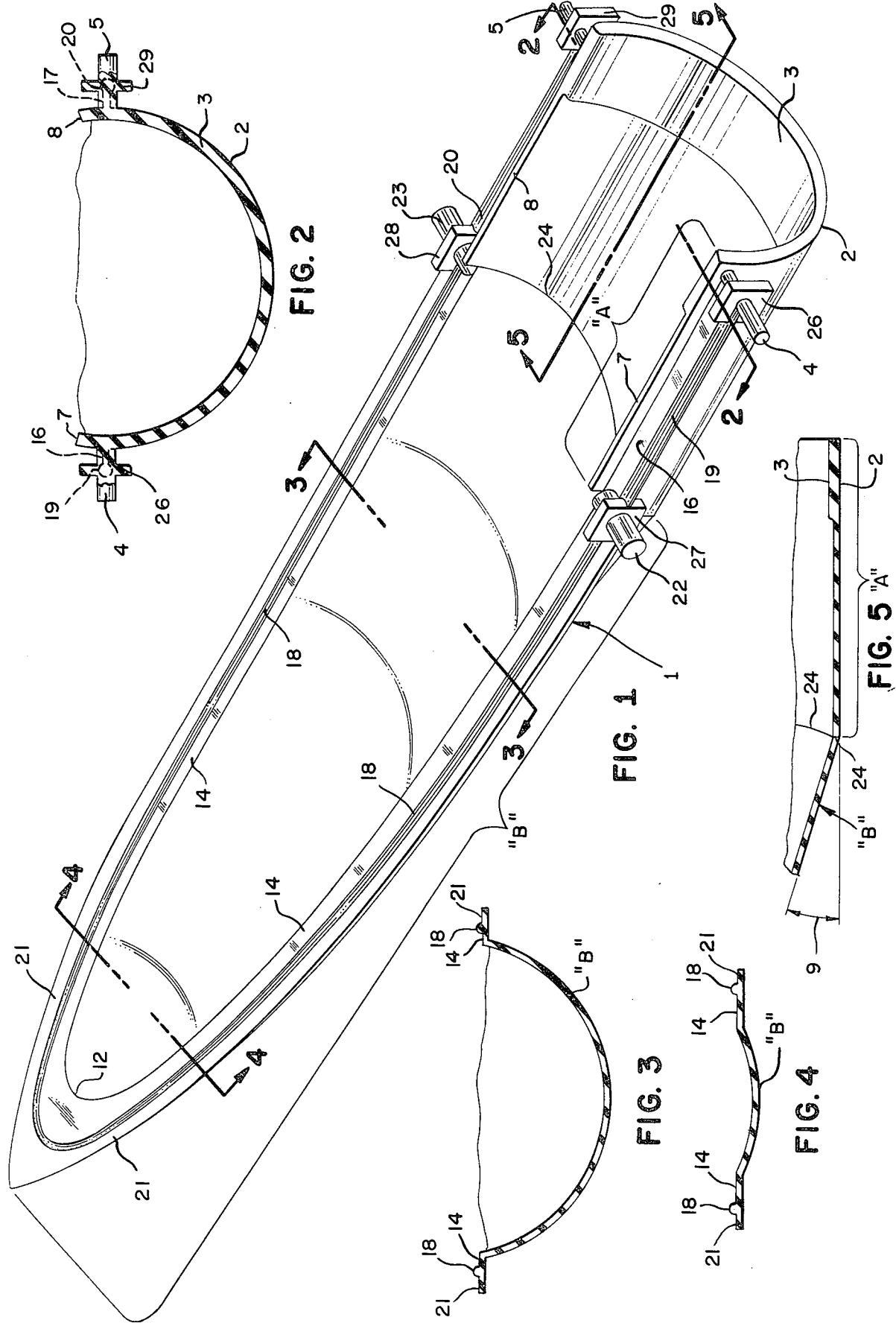

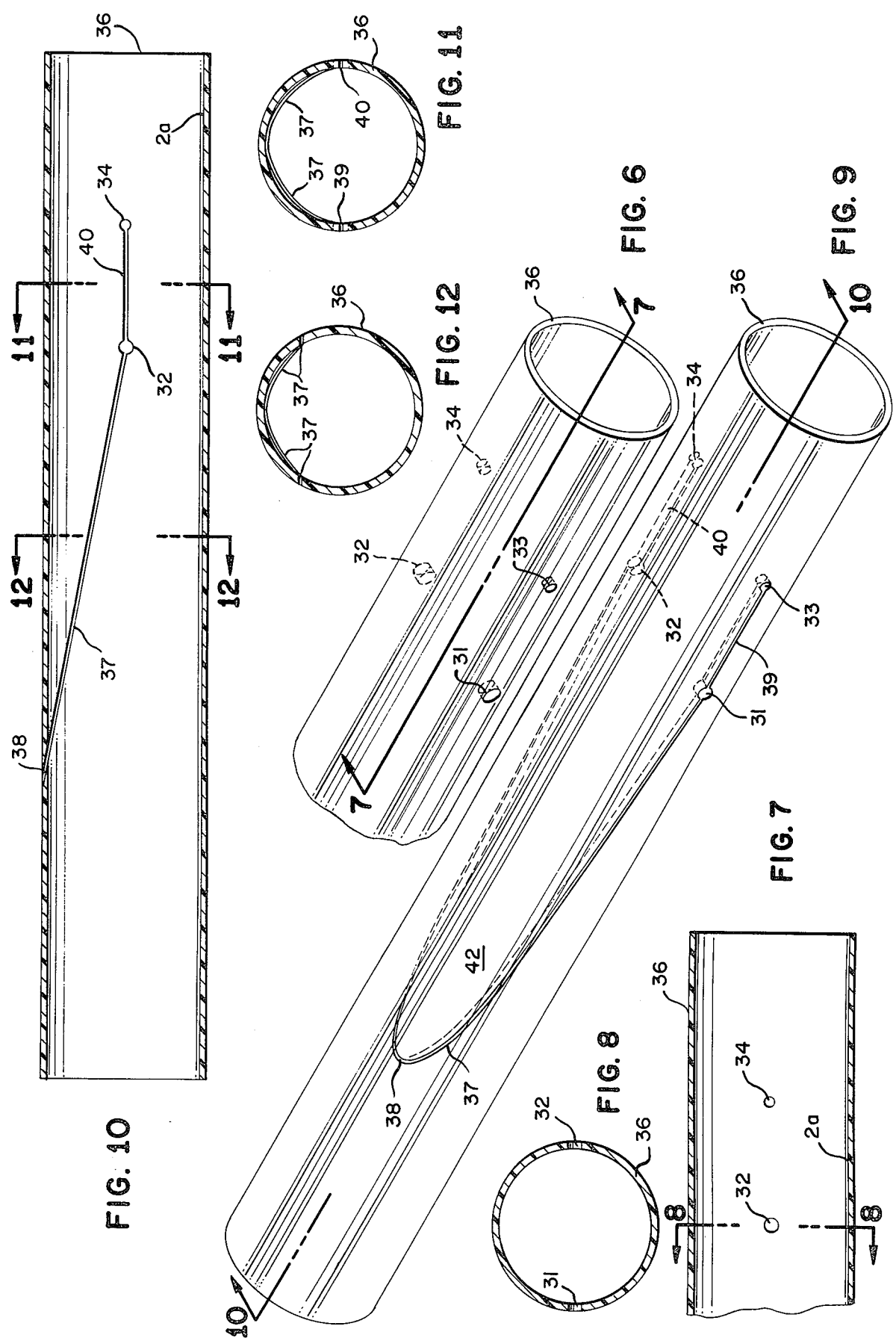

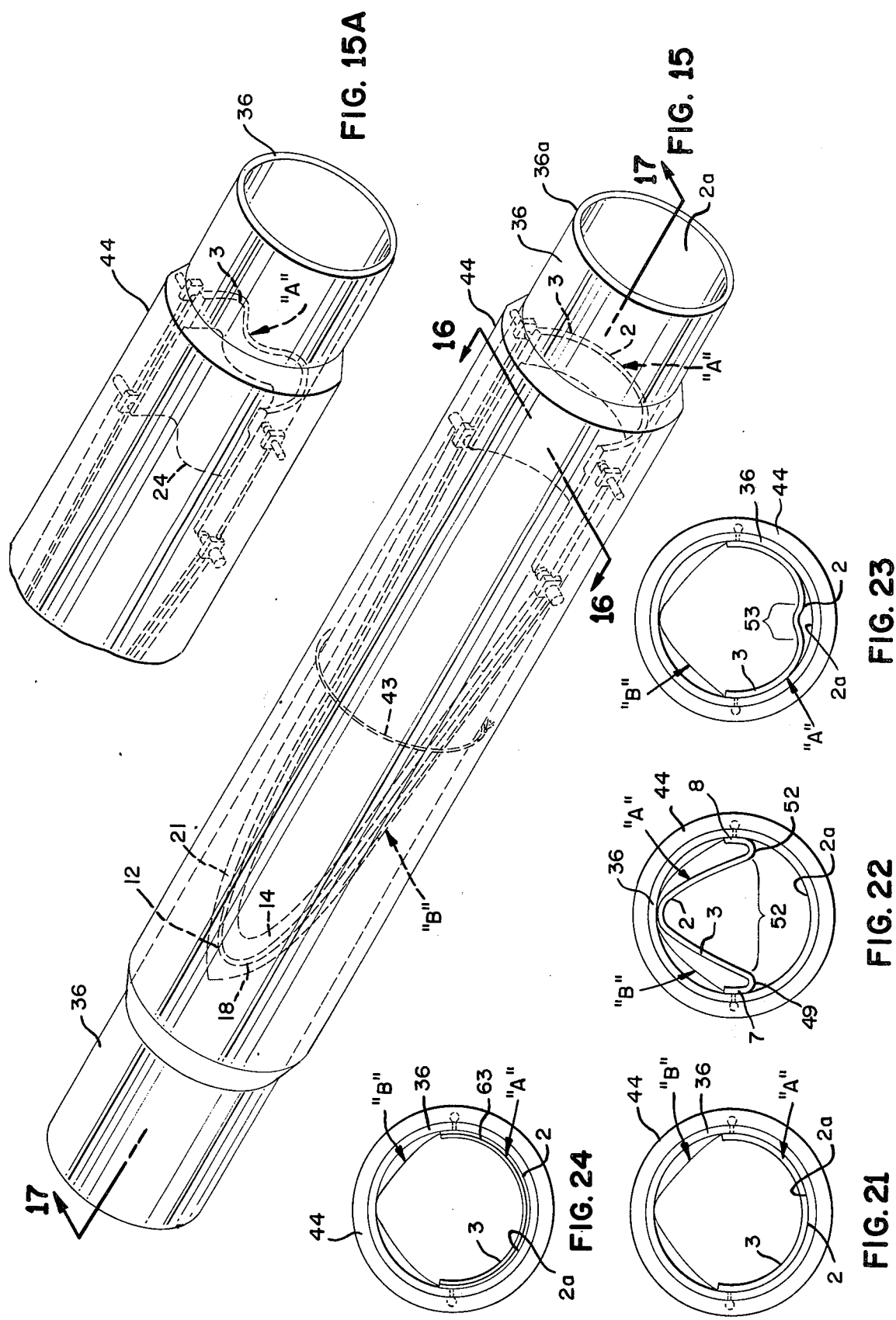

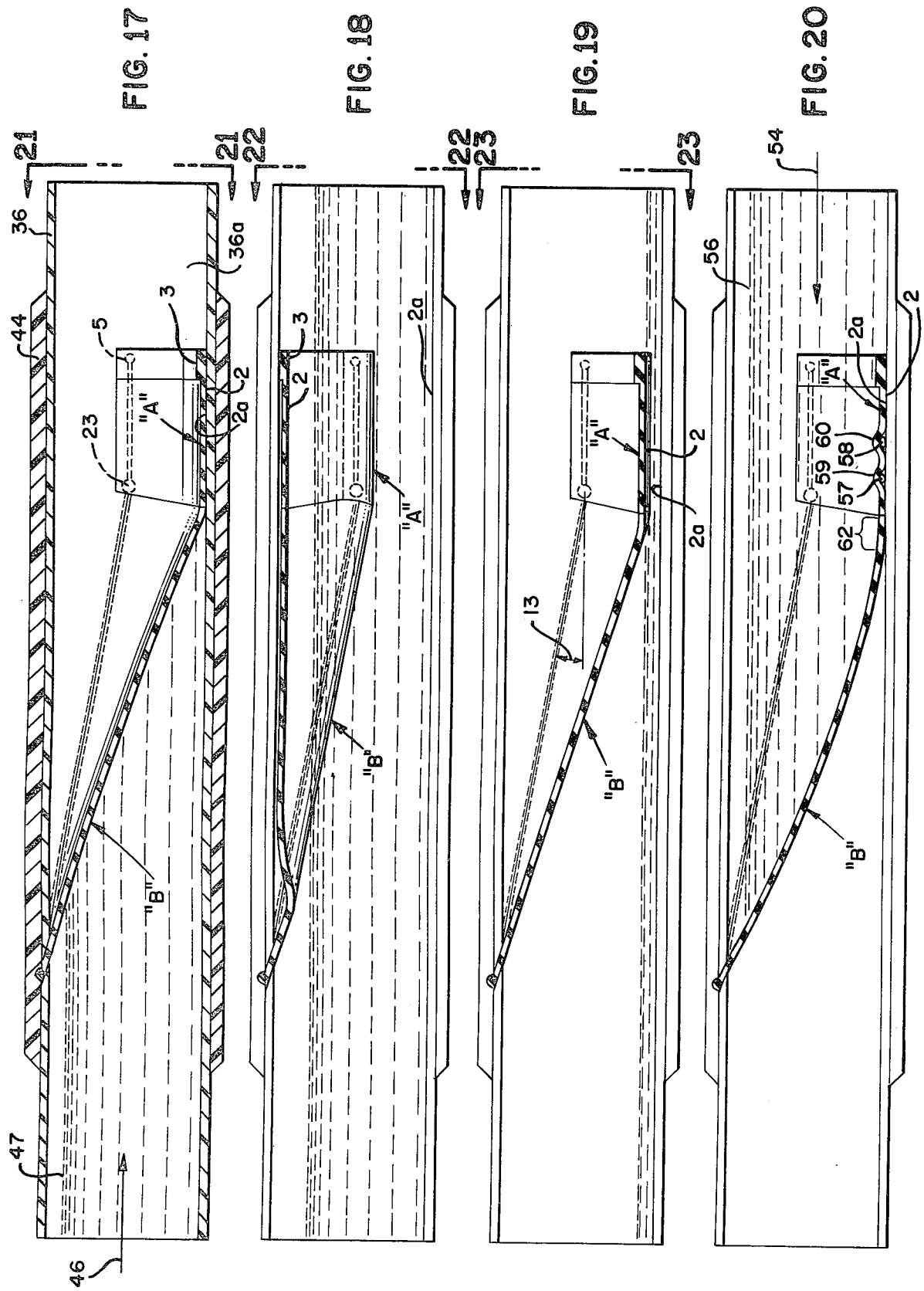

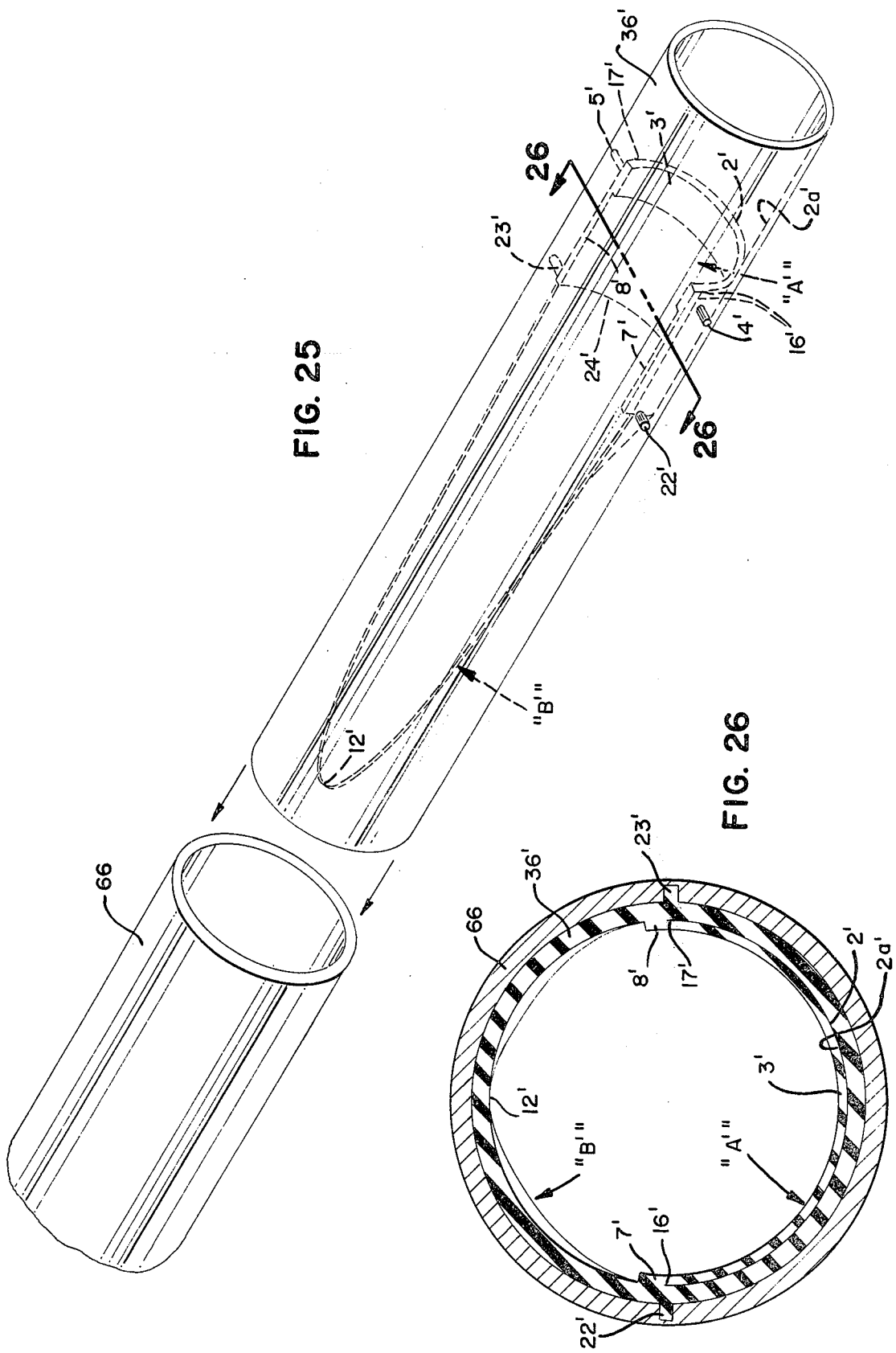

ELASTIC CHECK VALVE AND METHOD OF CONSTRUCTION

BACKGROUND OF THE INVENTION

Check valves used to stop the flow of fluid in one direction only and which automatically close when the direction of flow reverses are commonly made of metal and consist of a rigid gate which pivots about a point mounted in the valve housing. Generally such check valves automatically close using the gravity forces imposed upon the weighted pivotally mounted gate.

Such rigid, pivoting check valves must be periodically cleaned through "clean out" openings or they become inoperative due to the accumulation of solids carried in the fluid. Further, such metal valves corrode and require periodic maintenance to insure the proper operation of the bearings about which the gate pivots.

Even when properly maintained, a solid object carried by the fluid can become lodged between the gate and its seat thereby holding the valve open and permitting reverse flow of fluid. Metal check valves, in addition to being expensive, also can "chatter" if the fluid is subject to frequent reversals or surges in the fluid flow and cause a noise nuisance problem.

Standard check valves generally pass fluid proportional to the fluid pressure and thus in some applications will pass a steady flow and thus will not automatically flush but permit the buildup of solids carried by the fluid in and about the seat of the valve thereby interfering with the closing of the valve.

Metal rigid check valves are heavy and unless counterweighted, a relatively large pressure is required to permit the flow of fluid, especially in large diameter pipes. Standard check valves further require gravity for closure and therefore are not safely dependable in moving, tilting or inverted applications.

SUMMARY OF THE INVENTION

The gist of the present invention is the use of a flexible, elastic diaphragm member mounted in a pipe and having a portion with a first position in curved sealing engagement with the pipe and a second position in which the portion reverses its initial curvature to permit fluid flow through the pipe.

An object of the present invention is to provide a check valve having only a single non-metal movable member.

Another object is to provide a check valve which will remain closed until a slight positive pressure causes the elastic member to flex open in a snap-action providing a flushing type discharge of fluid and yet will only open sufficiently to pass the fluid and then will return to sealing position with a snap-action.

A further object is to provide straight line pipe flow, free of obstructions, changes of direction or rough surfaces met in standard metallic swing and lift check valves.

Still another object is to check backflow in trash-laden liquid wastes, sludges, silts, slurries and liquids containing stringy materials in a valve which has no projecting parts to catch rags, weeds or other debris.

Another object is to provide a check valve which has no metallic parts to corrode or rust and which can be used in such diverse applications as chemical processing plants, beverage production facilities, marine installations, flow process equipment, petroleum refineries, foot valves in pumping systems, sewage backwater valves, sewage lift stations, septic tank dosing chambers and corrosive liquid handling piping systems.

A further object is to provide a check valve which is less expensive than comparable metal check valves, requires less maintenance, operates without a sound, and will seal even though solid objects become lodged in the sealing area of the elastic member thereby preventing reverse flow of noxious gases and fluids.

An additional advantage of the present check valve is the fact that it is not dependent upon gravity to close the valve. The valve will close in any position. This feature is particularly important in marine applications where the check valve is used on bilge pumps. The valve automatically closes and thus there is no fear of losing a boat for failure of a check valve to close. Such a feature becomes of paramount importance in aeronautic or aerospace fluid-handling applications, where positive valve closure in inverted or gravity-free environments is required.

BRIEF DESCRIPTION OF THE DRAWINGS

FIG. 1 is a perspective view of the elastomer diaphragm constructed in accordance with the present invention.

FIG. 2 is a cross section of the diaphragm taken generally along line 2—2 of FIG. 1.

FIG. 3 is a cross section of the diaphragm taken along line 3—3 of FIG. 1.

FIG. 4 is a cross section of the diaphragm taken along line 4—4 of FIG. 1.

FIG. 5 is a cross section of the diaphragm taken along line 5—5 of FIG. 1.

FIG. 6 is a partial perspective view of a section of pipe formed with openings in preparation for the receipt of the diaphragm of FIG. 1.

FIG. 7 is a partial cross section of a portion of the pipe shown in FIG. 6 taken along line 7—7.

FIG. 8 is a cross section of the pipe shown in FIG. 7—7 taken along line 8—8.

FIG. 9 is a perspective view of the pipe shown in FIG. 6 with slots cut or formed in the pipe in further preparation for the receipt of the diaphragm of FIG. 1.

FIG. 10 is a cross section of the pipe shown if FIG. 9 taken along line 10—10.

FIG. 11 is a cross section taken along line 11—11 of FIG. 10.

FIG. 12 is a cross section taken along line 12—12 of FIG. 10.

FIG. 15 is a perspective view of another form of the invention showing the diaphragm of FIG 1 mounted in the pipe as prepared in FIGS. 6–12 and with a molded sleeve enveloping the pipe and holding the diaphragm in place. The diaphragm is shown in the "non-flow" position.

FIG. 15A is a perspective view of a portion of the assembly shown in FIG. 15 showing the diaphragm in a partial "flow" position.

FIG. 17 is a cross section of the valve assembly of FIG. 15 taken along line 17—17. The diaphragm is shown in the approximate position it would assume just prior to opening under a selected head of fluid.

FIG. 18 is a cross section of the valve assembly of FIG. 15 taken along line 17—17. The diaphragm is shown in the approximate position it would assume when it is in the nearly fully "open" position and passing the flow of fluid.

FIG. 19 is a cross section of the valve assembly of FIG. 15 taken along line 17—17. The diaphragm is shown in the approximate position it would assume when it is in the slightly "open" position and passing a limited fluid flow.

FIG. 20 is a cross section of the valve assembly of FIG. 15 taken along line 17—17. The diaphragm is shown in the approximate position it would assume when it is in the fully closed position and it is withholding a "reverse" flow of fluid.

FIG. 21 is an end view of the valve assembly taken in the direction of line 21—21 of FIG. 17.

FIG. 22 is an end view of the valve assembly taken in the direction of line 22—22 of FIG. 18.

FIG. 23 is an end view of the valve assembly taken in the direction of line 23—23 of FIG. 19.

FIG. 24 is an end view of a modified form of the invention.

FIG. 25 is another modified form of the invention.

FIG. 26 is a cross section taken along line 26—26 of FIG. 25.

BRIEF DESCRIPTION OF THE PREFERRED EMBODIMENTS OF THE INVENTION

Figure 14:
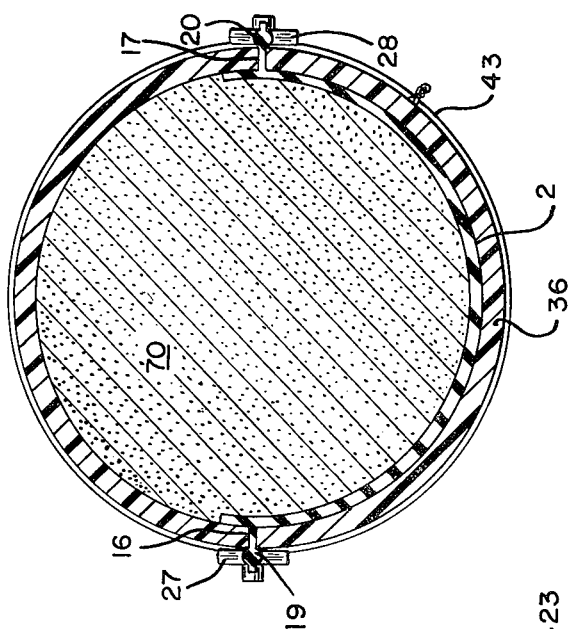
FIG. 14 is a cross section of the pipe of FIG. 13 taken along line 14—14.

The key article of manufacture in the present invention is an elastic diaphragm indicated by the number 1 and shown in FIG. 1 as well as several other figures. The diaphragm is divided in two main parts; viz, a "foot" section delineated by the brackets "A" and a "bowsprit" section delineated by the brackets "B." The diaphragm may be constructed from any elastic material which has a "memory", i.e., it has a bias to return to its original shape after being flexed by an external force. Some suitable materials are natural rubber, ethylene propylene, Neoprene, Buna N, and Silicon Rubber. The diaphragm is cast in a suitable mold in the shape hereafter described.

The "foot" portion "A" is cast so that the outer surface will register and seal with the inner surface 2a of a fluid conduit. Typically, the fluid conduit will be a cylinder so that the shape of the "foot" is a half cylinder. The diameter and length of the foot varies depending upon the diameter of the conduit into which it is to be mounted. For a 4 inch inside diameter pipe, the outer diameter of the "foot" will be 4 inches and the length about 3 ½ inches. The diaphragm wall thickness may vary but for the example set forth herein a suitable dimension is about 1/16 inches. While not essential, it is preferable to reinforce the end of the foot with an added thickness of elastic material along an annular inner band 3 for added "spring" return which will be explained in detail later in the specification. In the example, the band 3 preferably has a thickness of about ⅛ inch and a length of about ⅞ inch.

Projecting from the sides of the "foot" portion at about the mid-plane and at the end are nubs 4 and 5 which are dimensioned to register with openings in the pipe. In the example, the nubs have a diameter of about 3/16 inches and protrude about ⅝ inches beyond the outer wall of the "foot".

The bowsprit section "B" is so named because it generally has the shape of a round-bottom ship's bow. Actually, the bowsprit section "B" is that shape which results from the intersection of a right circular cylinder having the same diameter as the diameter of the "foot" section right circular cylinder at an angle 9 of about 17°. The "bowsprit" section extends from a lower edge 24 which touches the lower inside face of the pipe to a point 12 which intersects the opposite or upper side of the inside surface of the pipe.

The diameter of the pipe and length of the "bowsprit" determine the angle, if any, between the axis of the foot portion and the upper edge of the "bowsprit" section. This angle is shown on FIG. 19 as angle 13 and in the example it measures between 10 and 13°.

Extending outwardly from the top surface of the "bowsprit" section is a flange section 14 which is dimensioned to register with the slot in the wall of the pipe to be described later. The "foot" section also has two similar flanges 16 and 17.

Formed on the upper side of the "bowsprit" flange is a bead 18 which is designed to lie along the outside wall of the pipe. The flanges of the "foot" portion are similarly formed with beads 19 and 20. An additional flange 21 lying in the same plane as flange 14 extends outwardly from the bead 18. This additional flange is dimensioned so as not to extend beyond the clamping means later to be explained.

A second set of nubs 22 and 23 extend at about a point corresponding with the intersection of flange 14 with flanges 16 and 17. The intersection of the "bowsprit" section and the foot section is indicated by curved line 24.

As a further means of locking the diaphragm and a pipe, and as assembly aid, rectangular or otherwise shaped flanges extending in a generally vertically aligned plane are indicated by the numbers 26, 27, 28, and 29. It has been found that in order to seal the diaphragm and to help spring return of the member itself, it is desirable to extend the walls of the foot portion above the flanges a short distance forming extensions 7 and 8.

One method of assembling the diaphragm in a section of pipe to form a check valve is shown in FIGS. 6 through 14.

The first step is to drill four holes 31, 32, 33, and 34 in a section of pipe 36; all in the same plane and on opposite sides of the pipe. Hole 33 is dimensioned to receive nub 4, hole 34 receives nub 5, hole 31 receives nub 22 and hole 32 receives nub 23. Pipe 36 is commonly made from a plastic material such as polyvinyl chloride (pvc), but is may be made from any other rigid fluid-impermeable material.

The second step is illustrated in FIG. 9 in which a saw cut 37 is made in the pipe beginning at point 38 and ending at holes 31 and 32. The saw cut is made on the same plane and can be made with a band saw. The next step is to cut slots 39 and 40 running from openings 31 to 33 and from 32 to 34 respectively. These cuts are in the same plane and can be made with a circular saw or any other appropriate means. The grooves and openings are well illustrated in FIG. 10.

The next step in the manufacture of the check valve is to place the diaphragm illustrated in FIG. 1 in the pipe 36.

Figure 13:
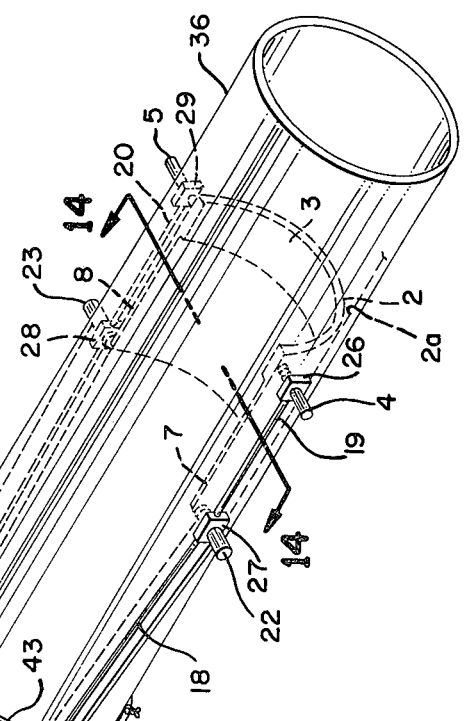
FIG. 13 is a perspective view of the diaphragm of FIG. 1 mounted in the pipe as prepared in FIGS. 6–12.
Figure 16:
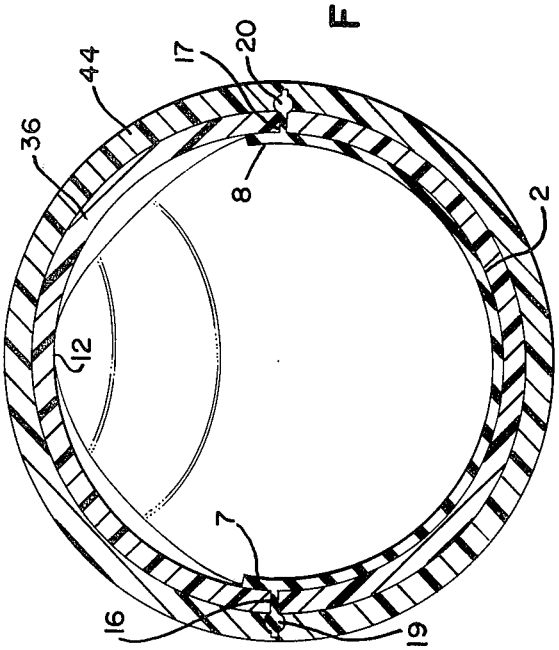
FIG. 16 is a cross section of the assembly of FIG. 15 taken along line 16—16.

The slot 37 is widened by prying upwardly on the flap section 42 of pipe 36 and wedging the flap open at point 38. Nub 22 is placed through opening 31; nub 4 is placed through opening 33; nub 23 is placed through opening 32; and nub 5 is placed through opening 34. Flange 14 is placed in slot 37; flange 16 in slot 39; and flange 17 in slot 40. As shown in FIGS. 13 and 14, the beads 18, 19, and 20 are placed on the outside of pipe 36. Further, enlarged rectangular flanges 27, 26, 28, and 29 also lie on the outside of pipe 36.

When the diaphragm is in place, the wedge from point 38 is removed and a clamp is placed around pipe 36 to secure the flanges of the diaphragm in the slots. Clamps of various designs may be used; the simplest being a wire 43 placed tightly around the pipe 36.

A preferred means for holding the diaphragm in the pipe is illustrated in FIGS. 15 and 15A. In this form of the invention, a polyurethane sleeve 44 is molded around the portion of the pipe containing the diaphragm. This step is accomplished by suspending the assembly shown in FIG. 13 in a mold and then pouring in a charge of urethane foam. The urethane foam encapsulates the pvc pipe and the flange and bead of the diaphragm is gripped by the urethane sleeve which contracts after it has cured. Because of the expansion characteristic of the urethane as it cures, the inside of the pvc pipe must be restrained from buckling inwardly as with a mandrel, or a packing of sand 70. The urethane adheres to the rubber so that there is a bond as well as a mechanical lock formed therewith. The urethane sleeve is a closed cell type and thus waterproofs the entire assembly.

The operation of the check valve of the present invention is shown in FIGS. 17 through 23.

Referring first to FIG. 17, assume that the normal flow of fluid is in the direction of arrow 46. The water moves against the diaphragm "B" and is stopped. Portion "A" is in sealing engagement with the bottom half of the pipe. A unique feature of the present invention is the fact that when the valve is placed on a gently sloping angle to the horizontal such as when it is used in a sanitary sewer, the fluid builds up behind the diaphragm to a level 47 as shown in FIG. 17. Tests have shown that neoprene rubber diaphragms will hold back a head of about 7 inches water pressure. When pressure has been build up, the diaphragm portion "B" will assume a slightly upwardly curved form as shown in FIG. 17. Suddenly, with a "snap-type" motion, the foot portion "A" of the diaphragm reverses its curvature as shown in FIG. 22 and permits the water to pass with a surge which flushes the portion 36a of the pipe downstream of the diaphragm. Given sufficient pressure of fluid, the reverse fold of the diaphragm can be equal to about 90 percent of the cross sectional area of the connecting pipe. Referring to FIG. 22, it may be seen that the sections 47 and 48 of the diaphragm 1 immediately adjacent the inside wall of the pipe 36 remain in their initial positions, concentric to the curvature of the wall. Immediately adjacent to sections 7 and 8, however, the diaphragm reverses curvature in a small radius at portions 49 and 50. Portions 49 and 50 in effect become a type of "spring" which, because of the elasticity of the member, attempt to return the diaphragm to the original shape shown in FIG. 21. The portion of the diaphragm shown by bracket 52 remains in an approximate sine curve, partly touching the upper wall of the pipe until the water level and pressure recedes. The foot of the diaphragm tends to snap back into the original sealed position shown in FIG. 21 and quickly cuts off the flow of fluid just prior to a complete drainage of the pipe when the material is neoprene. It should also be noted that the diaphragm does not stay in the fully open position while the flow is decreasing, but rather tends to move back to the sealing position. Moreover, the shape of the diaphragm tends to maintain a close contact with the fluid so that there is no escape of gases in a direction counter to the flow of the fluid.

The action of the diaphragm is somewhat dependent upon the material used in its construction. While as stated above, neoprene tends to cause the diaphragm to act with a "snap-action", Buna N tends to open and close more slowly and more in proportion to the rate of flow of fluid. FIGS. 19 and 23 illustrate the use of Buna N material. If, for example, there is a relatively small flow of fluid, the foot will only open a small amount as shown by the reversal in curvature of portion 53. There is less "snap-action" involved when the diaphragm is made from ethylene propylene.

FIG. 20 illustrates a backflow surge of fluid in the direction shown by arrow 54. Note that the fluid level is nearly to the top of the pipe as shown by number 56. While there could be some buildup of fluid to the left of the diaphragm as shown in FIG. 20, for purposes of illustration there is none. Note that the diaphragm B will curve downwardly as shown in FIG. 20.

Another unique feature of the check valve of the present invention is shown in FIG. 20. If one or more solid pieces of matter 57 and 58 do not clear the foot area "A," the flexible foot will merely seal around and over the solid pieces by deformations 59 and 60. Thus no fluid will be permitted to flow in a reverse direction.

The ability of the valve to seal even when solids become trapped below the foot also holds true when the direction of flow is in the normal direction as shown by arrow 46 of FIG. 17.

Because of the unique construction of the diaphragm, the sealing becomes even greater as the backwater pressure builds up. As shown in FIG. 20, the area of sealing will be increased with pressure and a portion of part "B" as shown by bracket 62 will be pressed against the inside wall of the pipe. One valve of the present invention has been tested and found to withstand a back flow pressure of 20 feet of water head.

The ability of the valve of the present invention to remain unclogged after severe usage in sanitary sewers has a major advantage of the valve. Since it is very difficult for any material to stick to rubber, no buildup of material has been noted even after long usage. Moreover, since the diaphragm flexes each time it opens and closes, the undulating motion tends to break off any material clinging to the rubber.

Very slight pressure differential is required to allow the free-acting elastomer diaphragm to flex open or closed. The diaphragm can be made to snap back more readily by adding more thickness to the end of the diaphragm as shown in FIGS. 1 and 5 at built-up end 3.

Because there is no build-up valve seat protruding from the wall of the pipe as in regular check valves, the flow is smooth, straight or continuous. This tends to prevent any accumulation of debris in the check valve which would hamper its operation and also keeps solids in solution much better.

It has been found that one simple means for retarding the opening of the valve opening to accommodate higher head pressures is to construct the diaphragm member with an inner layer of woven reinforcement such as a nylon or other woven filament. The reinforcement may be inserted into the mold used to form the diaphragm. This modified form of the invention is similar in all respects to the previously described diaphragm and therefore only one section as shown in FIG. 24 is used to illustrate the addition of the reinforcement 63.

The introduction of reinforcement material in the diaphragm member also is a means for strengthening the valve diaphragm so as to accommodate higher backwater pressures.

Still another form of the invention is illustrated in FIGS. 25 and 26. The operation of this form of the invention is identical to the previously described check valves. The main difference is that instead of the diaphragm being a separate element and connected at its edges to a rigid plastic pipe, the diaphragm is an integral part of a rubber, Neoprene, Buna N, silicone rubber or ethylene propylene sleeve. Specifically, diaphragm A' is integrally connected to sleeve 36' which is inserted into a metal or plastic pipe 66. The foot portion B' is free to reverse its curvature to permit passage of fluid and is hinged to the "bowsprit" section B' along the line of intersection 24' between the "bowsprit" section and the foot section. The foot is hingedly joined to the sleeve 36' along lines 16' and 17' which correspond to the approximate locations of the flanges 16 and 17 in the form of the invention shown in FIG. 2.

The "bowsprit" section B' is joined to the sleeve member 36' along line 12'.

The sleeve and diaphragm member is positioned in a pipe 66 by first drilling or forming four openings in the side wall of the pipe. Nubs 22' 23', 4', and 5' are then inserted through the openings. The entire sleeve is then adhered to the inside wall of the pipe 66' by a suitable adhesive or by vulcanization. In most applications, however, it is necessary to mechanically connect the sleeve to the pipe. This may be accomplished by forming the sleeve with a length longer than the pipe section and turning the sleeve back over the outside of the pipe in "cuff" fashion. The sleeve is then secured to the pipe by any suitable clamping means. This method is only examplary and other mechanical fastening methods may be used.

I claim:

1. An article of manufacture for a check valve in an enclosed curvilinear conduit comprising:
  a. an elastic, flexible semi-circular elongated "foot" portion of curvilinear cross section dimensioned for non-sealing and registered sealing engagement with approximately one half the cross sectional surface of an elongated portion of said matching curvilinear conduit and having an upstream end and a downstream end;
  b. said foot portion having means for attaching its upper edges to the side walls of said conduit;
  c. an elastic, flexible elongated "bowsprit" portion having that shape resulting from a curvilinear tube intersecting said conduit at an angle wherein said "bowsprit" is that portion of said curvilinear tube lying below the intersection line of said curvilinear tube and said conduit;
  d. said "bowsprit" portion having a width at its downstream end substantially equal to the inside diameter of said conduit and said "foot" portion and tapering to a blunt circular point at its upstream end;
  e. said downstream end of said "bowsprit" portion is connected to said upstream end of said "foot" portion;
  f. said "bowsprit" portion having edges which lie in a substantially flat plane corresponding to said intersection line of said curvilinear tube and said conduit;
  g. said "bowsprit" portion having means adapted for attachment of said edges to the side walls of said conduit wherein said edges are adapted for attachment to said conduit along a line lying in a single flat plane which extends from a point on the top edge of said conduit to points lying on approximately the mid point of said conduit; and
  h. said "foot" portion and said "bowsprit" portion are capable of flexing in a reverse curved direction upon application of external pressure and have a "memory" for automatically returning to their original curvatures upon the removal of such external pressure.

2. A check valve as described in claim 1 comprising:
  a. said conduit is a right circular cylinder; and
  said "foot" and "bowsprit" sections are formed from right circular cylinders wherein said curvilinear tube generating said "bowsprit" is a right circular cylinder.

3. A check valve comprising:
  a. an elongated conduit;
  b. a diaphragm consisting of the following:
    1 an elastic, flexible elongated "foot" portion of curvilinear cross section dimensioned for registered sealing engagement with the surface of a portion of said matching curvilinear conduit;
    2 said foot portion having means for attaching its upper edges to the side walls of said conduit;
    3 an elastic, flexible elongated "bowsprit" formed from a portion of said curvilinear conduit intersecting and joining said foot portion at an angle;
    4 said "bowsprit" portion tapering upwardly and having its upstream edge adapted for connection to the upper side of said conduit;
    5 said "bowsprit portion having means adapted for attachment of its edges to the side walls of said conduit; and
    6 said "foot" portion being capable of flexing in a reverse curved direction upon application of external pressure and having a "memory" for automatically returning to its original curvature upon the removal of such external pressure;
  c. said conduit and said diaphragm are formed from the same material and are integrally connected; and
  d. said conduit is dimensioned for receipt within a second conduit and is connected thereto.

4. A check valve comprising:
  a. an elongated conduit;
  b. a diaphragm consisting of the following:
    1 an elastic, flexible elongated "foot" portion of curvilinear cross section dimensioned for registered sealing engagement with the surface of a portion of said matching curvilinear conduit;
    2 said foot portion having means for attaching its upper edges to the side walls of said conduit;
    3 an elastic, flexible elongated "bowsprit" formed from a portion of said curvilinear conduit intersecting and joining said foot portion at an angle;
    4 said "bowsprit" portion tapering upwardly and having its upstream edge adapted for connection with the upper side of said conduit;
    5 said "bowsprit" portion having means adapted for attachment of its edges to the side walls of said conduit; and
    6 said "foot" portion being capable of flexing in a reverse curved direction upon application of external pressure and having a "memory" for automatically returning to its original curvature upon removal of such external pressure;
c. said "bowsprit" means consisting of an integral flange extending outwardly from said "bowsprit" and said flange having a raised bead adapted for positioning on the outside of said conduit;
d. said "foot" means consisting of an integral flange extending outwardly from said "foot" portion and said flange having a raised bead adapted for positioning on the outside of said conduit;
e. said conduit being formed with a pair of slots lying in the same plane and beginning at a point in the upstream end and upper wall of said conduit and extending in an ever diverging relationship downwardly toward the downstream end to approximately the midportion of the wall of said conduit; thence in a direction approximately parallel to the longitudinal axis of said conduit in a downstream direction; and
f. clamp means pressing the edges of said slots together and thereby frictionally engaging said "bowsprit" and "foot" flanges in fluid sealing engagement.

5. A check valve as described in claim 4 comprising:
a. said clamp means consists of a cast, continuous annular elongated member tightly engaging the walls of said conduit in a manner which mechanically locks the edges of said diaphragm between the edges of said slots.

6. A check valve as described in claim 4 comprising:
a. said clamp means consists of casting a quantity of closed cell urethane foam in close fitting annular relationship around said conduit.

7. An article of manufacture as described in claim 4 comprising:
a. said "foot" portion being formed with a thickened circumferential edge band for increasing the spring return ability of said foot to the sealing position.

8. An article of manufacture as described in claim 4 comprising:
a. said diaphragm being formed with a woven reinforcing member formed within said elastic material for strengthening said diaphragm and increasing the resistance to opening of said diaphragm.

* * * * *